United States Patent Office 3,380,071
Patented Apr. 23, 1968

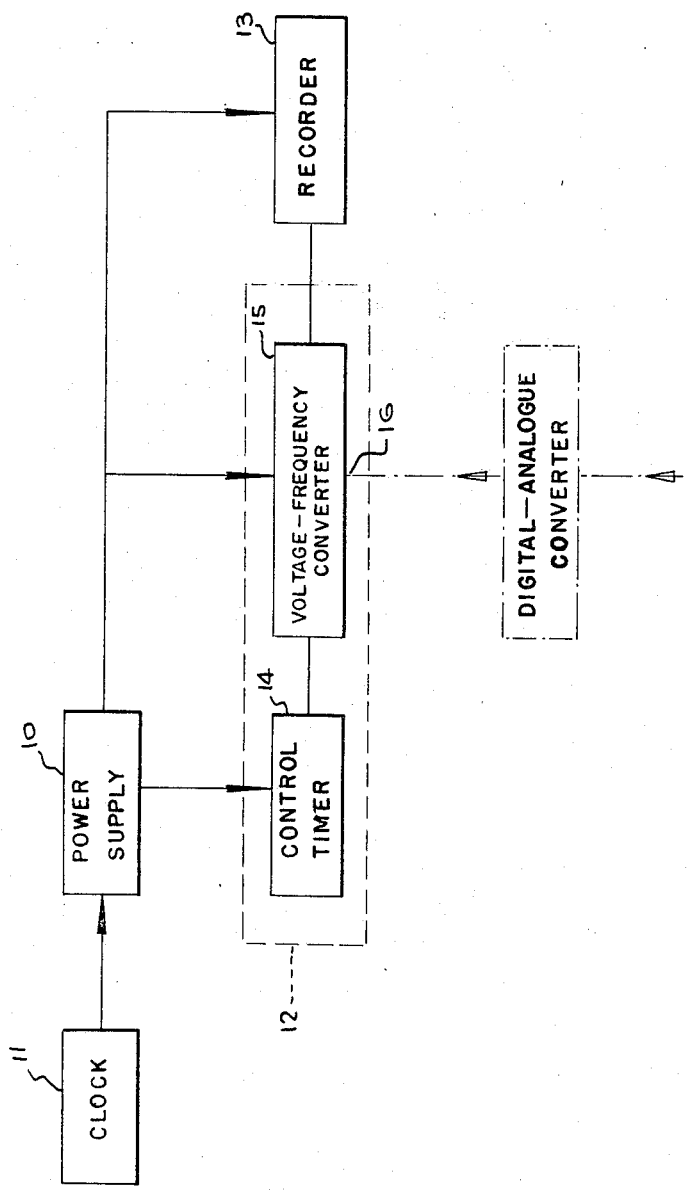

3,380,071
INTERMITTENTLY ACTUATED MAGNETIC RECORDING APPARATUS
Archibald Raymond Boyle and Paul McNeill Dunachie, Glasgow, Scotland, assignors to D-Mac Limited, Glasgow, Scotland
Filed Jan. 4, 1965, Ser. No. 423,016
Claims priority, application Great Britain, Jan. 4, 1964, 462/64
4 Claims. (Cl. 346—74)

ABSTRACT OF THE DISCLOSURE

Recording apparatus for intermittently recording parameters over a long period. An analogue signal representing a parameter is supplied through an analogue digital converter to a tape recorder, energization of the converter and recorder being controlled by a clock. Typically a recording may be taken once every fifteen minutes.

---

This invention is concerned with improvements in and relating to the recording of electrical signals.

For some considerable time, there has been a requirement in the fields of data collection and processing for a small and inexpensive recording apparatus which could sample slowly changing phenomena at regular intervals, record it in digital form, and run for long periods without attention and without the need for external power supplies.

The present invention is recording apparatus comprising a power supply, a magnetic tape recorder, an analogue-digital converter coupled with the power supply and having an input, a clock, means driven by the clock for energising the converter and recorder at predetermined intervals, whereby the recorder records the digital output from the converter corresponding to an analogue signal supplied to the input when the converter is energised.

An embodiment of the invention, will now be described, by way of example, with reference to the accompanying drawing which is a schematic block diagram of recording apparatus according to the present invention.

Referring now to the drawing recording apparatus according to the present invention, comprises a sealed waterproof and weatherproof casing which is provided with an inlet socket and in which are located a power supply 10, a clock 11, an analogue-digital converter 12 and a recorder 13 for recording the digital output of the converter 12 corresponding to an analogue signal supplied to the converter through the inlet socket 16 from an external transducer, or other signal producing device (not illustrated) the complete operation being controlled from the clock 11.

The power supply 10 is a battery which gives adequate power for normal use over a period of a year or more as will become apparent hereinafter.

The clock 11 includes an electrically powered escapement mechanism driving an output shaft and means driven by the output shaft for energising the converter 12 and the recorder 13. This means, in this embodiment, consists of a wiper, driven by the output shaft, which momentarily completes an electrical circuit at predetermined intervals of 15 minutes thus energising a relay which in turn closes contacts to energise the converter 12. The clock mechanism 11 is permanently connected to and energised by the power supply.

The analogue-digital converter consists of a timer control 14, and a voltage-frequency converter 15 connected to the inlet socket 16. The voltage-frequency converter 15 and timer control 14 are energised from the power supply 10 under the control of the clock 11.

The control timer 14, upon energisation provides a pulse accurately every tenth of a second, and controls the starting of the recorder 13 and then the voltage-frequency converter 15 in the appropriate sequence. The voltage-frequency converter 15 is a pulse generator which receives an analogue voltage signal and produces, over a period of one-tenth of a second, a number of pulses between 0 and 100 which depends on the level of the analogue signal.

The recorder 13 is a conventional small tape recorder, the recording head being supplied with the output from the voltage-frequency converter 15. The drive mechanism for the recorder is also energised from the power supply 10.

In use a transducer is coupled to the inlet socket and the escapement mechanism of the clock 11 is started. After fifteen minutes, the wiper completes its circuit, the relay is energised, its contacts close and the timer control 14 is energised and the tape recorder 13 is switched on. The first two pulses from the timer control 14 are counted and whilst this is being done the recorder is reaching its normal operating speed. After this two tenths of a second the voltage-frequency converter 15 is switched on, and recording of the pulses from it commences. After a further one tenth of a second a third pulse is produced by the timer control 14 which switches off the voltage-frequency converter 15. At the same time the relay is de-energised and the recorder and timer control are cut off from the power supply. The number of output pulses from the voltage-frequency converter 15 recorder in one tenth of a second is directly proportional to the output frequency and hence to the analogue input voltage from the transducer.

It is thus seen that the power demand on the power supply is low as the clock is the only continually operating component, the other components being energised very briefly only once every fifteen minutes. Power supplies capable of lasting for a year or more are readily available.

It is apparent that by altering components or their electrical values the frequency of recording and the duration of each recording can be varied within wide limits.

Various modifications may be made to the embodiment described. A pre-amplifier may be incorporated for the analogue signal and, if desired, several transducers may be used in which case a switch is incorporated cyclically to connect the transducers with the voltage frequency converter.

It is apparent that "time" is not normally added as an independent recording but is instead calculated from a knowledge of the time interval between recordings, the starting time, the finishing time and the total number of recordings.

It is therefore necessary to ensure that no recordings are lost. For example in the simple system described earlier a value of 0 could give zero pulses on tape and be thus the same as blank tape.

Whilst some complex marking systems are possible such as putting a special type of pulse between recordings or on a separate track, the simplest method is to add for example 5 pulses on to each number recorded, the actual number thus being for example from 5 to 105. This involves no extra circuitry in the recording apparatus and only a slightly extra complexity in the transistor.

In translation, 5 pulses (if this is the number chosen) is subtracted from each recording before output. The total number of pulses after this 5 (for example, in the range 0 to 100) is then counted and converted to the appropriate decade or coded form for output.

By the addition of various resistors to the counters in the translator unit, analogue voltage outputs can also be produced suitable to drive indicators or pen recorders.

As well as the possibility of using the second track of the magnetic tape for high speed recording references as described above it is also frequently useful to apply a simple marker to this track.

It is possible to do this merely by making a contact (either by means of a relay or transistor circuit) to apply a current pulse to this track head. More sophisticated methods may of course alternatively be used.

The use of such a simple marker may be to indicate each record, or each group of recordings, or long time intervals such as once every 12 hours, or to indicate the end of a variable length group of recording for example from a keyboard.

This marker is advantageous under the second heading where multi-channel recordings are to be made so that wherever the tape is started the actual channel number can quickly be located. The long time interval between such markers can be of use in order to check that no recordings have been lost under any circumstances. For example by the addition of an extra contact to the hour hand of the clock a pulse every 12 hours can be recorded.

It is also possible to supply a complete recording unit to the second track as well as to the first so that simultaneous recordings can be made through the two systems. This is a different method of multichannel recording from the normal serial multichannel arrangement.

This second channel if fitted with a full analogue to digital converter system can also be used in the form of a discriminating marker as for example values of 10, 20, 30 etc. can be used to give different indications relative to the recording in the first track.

Another more sophisticated use of the second track is for keyboard input for calibration values at random intervals during the automatic recording period. For example in river gauging the recording of level is advantageous by manual means on occasions when the operator visits the site. He obtains the value by visually noting the height of water against a post in the river and such calibration values added can be used as a cross check on the accuracy of the equipment.

In general, if the transducer or signal producing device provides a digital signal, the recording apparatus may be adapted to record this by the insertion of digital analogue converter prior to the voltage frequency converter.

This digital-analogue converter often consists only of a number of resistors selected by the digital push buttons (in a keyboard) or relay contacts or semiconductor circuits in an encoding matrix or counter. These resistors are arranged so that they give values of voltage at 10 positions between zero and full scale. The supply voltage to the resistor chains is available from the recording apparatus power supply. Each digit of 0 to 9 as it is entered is thus recorded as 00 to 90. An improvement on this to allow for drop-out and other errors is to record from 07 to 97. These differences are easily and simply obtained by selection of appropriate resistor values in the digital analogue converter. In translation only the significant digit (i.e. the first) of the two described above is output and valid information.

We claim:
1. Recording apparatus comprising a power supply, a magnetic tape recorder coupled with the power supply and having a recorder head and a drive mechanism, an analogue-digital converter coupled with the power supply and having an input and an output which is connected to a single channel in the recorder head, and means driven by a clock normally electrically disconnecting said power supply from said recorder and converter and conditioned at predetermined intervals to momentarily electrically connect the same for energizing the recorder drive mechanism and the recorder head and the converter at predetermined intervals whereby the recorder records in a single channel the digital output from the converter corresponding to an analogue signal supplied to the input when the converter is energized.

2. Recording apparatus as claimed in claim 1, in which the analogue-digital converter includes a control timer energisable from the power supply under the control of the clock.

3. Recording apparatus as claimed in claim 2, in which the analogue-digital converter includes a voltage-frequency converter which is energisable from the power supply under the control of the control timer.

4. Recording apparatus as claimed in claim 3, in which the control timer controls the energisation of the recorder.

References Cited
UNITED STATES PATENTS

| | | | |
|---|---|---|---|
| 3,217,329 | 11/1965 | Gabor | 340—174.16 |
| 3,119,992 | 1/1964 | Fluegel | 340—347 |

BERNARD KONICK, *Primary Examiner.*

A. I. NEUSTADT, *Assistant Examiner.*